Aug. 19, 1924.
R. H. WHITELEY
HEATER CONDUIT
Filed April 23, 1923
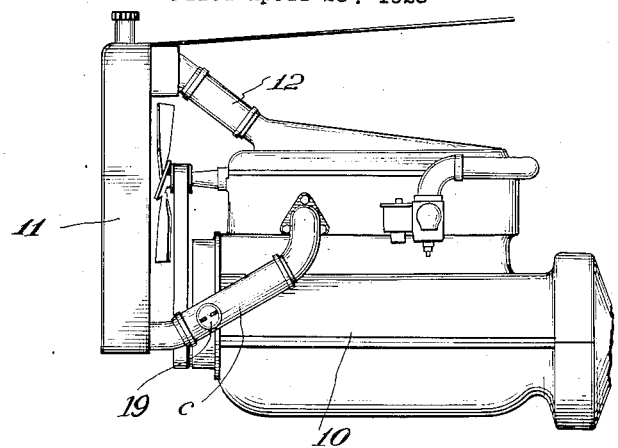
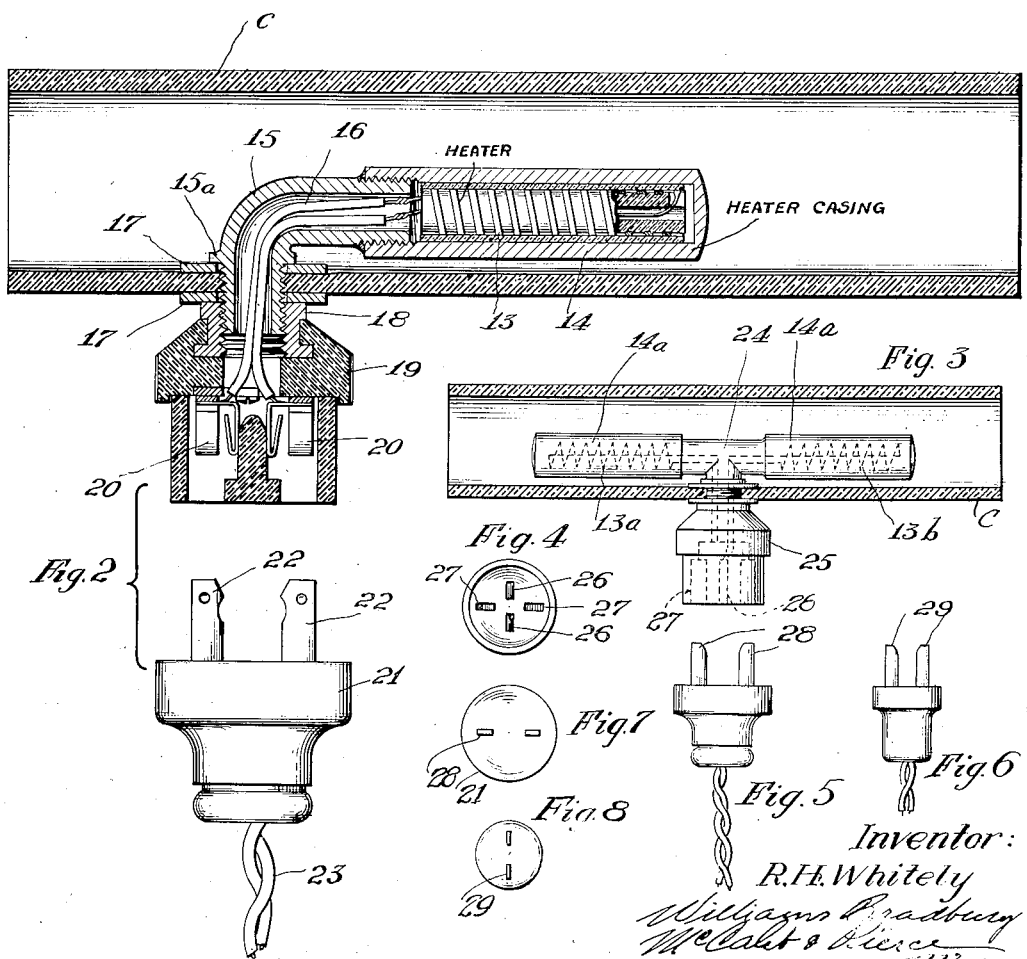
Inventor:
R. H. Whitely Patented Aug. 19, 1924.

1,505,179

UNITED STATES PATENT OFFICE.

ROBERT H. WHITELEY, OF CHICAGO, ILLINOIS, ASSIGNOR TO EDWARD A. ZIMMERMAN, OF CHICAGO, ILLINOIS, TRUSTEE.

HEATER CONDUIT.

Application filed April 23, 1923. Serial No. 633,902.

*To all whom it may concern:*

Be it known that I, ROBERT H. WHITELEY, a citizen of the United States, and resident of Chicago, in the county of Cook and State of Illinois, have invented a certain new and useful Improvement in Heater Conduits, of which the following is a full, clear, concise, and exact description, reference being had to the accompanying drawings, forming a part of this specification.

My invention relates to a heater-conduit adapted to form part of the cooling medium circulating system of an internal combustion engine of any of the several types commonly employed as power plants of automotive vehicles.

Heretofore electric heaters have been used in connection with liquid cooled automobile engines for the purpose of preventing the cooling liquid from freezing when the engine stands idle in cold weather and for warming the engine cylinders prior to starting. However, all of these prior devices, which have come to my attention, have been so constructed or applied as to be very expensive, inefficient, difficult to install or unable to withstand the jars and jolts which are unavoidable in the operation of an automobile. Generally stated, it is the object of my invention to provide a heating arrangement which eliminates the disadvantages which characterize the prior heaters.

In the accompanying drawings illustrating my invention:

Figure 1 is an elevational view illustrating the heater-conduit of my invention applied to an automobile engine;

Figure 2 is a longitudinal sectional view of the heater-conduit;

Figure 3 is a view similar to Figure 2, but illustrating a modified embodiment of my invention;

Figure 4 is an end view of the socket member forming part of the device shown in Figure 3;

Figures 5 and 6 are elevational views of plug members which may be employed in connection with the aforesaid socket member; and Figures 7 and 8 are, respectively, end views of the plug members illustrated in Figures 5 and 6.

Similar characters of reference refer to similar parts throughout the several views.

Referring first to Figure 1, at 10 I have illustrated an automobile internal combustion engine which may be regarded as having a cooling system of the thermo-siphon type. This system comprises the usual radiator 11 having its upper portion connected with the water jackets of the engine through a flexible hose connection 12, which has its ends slipped over and clamped to metal conduits connected with the upper portion of the radiator and with the water jackets of the engine. The lower end of the radiator is likewise connected with the water jackets of the engine through a flexible hose or conduit C which is likewise slipped over the ends of and clamped to metal pipes or conduits which communicate with the lower end of the radiator and with the water jackets of the engine. My invention is concerned with the conduit C and the several parts carried thereby.

While the conduit C may be formed of a variety of suitable materials, it is conveniently in the form of a section of fabric and rubber hose of the type commonly employed in connection with the cooling systems of automobile engines. The essential requirements of the conduit C are that it be strong enough and flexible enough to carry and protect the electric heater in the manner presently to be explained.

At 13 I have illustrated an electrical heating coil which is supported within and suitably insulated from an elongated metal shell 14, which in turn is disposed within the conduit C and has its axis disposed substantially parallel to the axis of the conduit C. The shell 14 is closed at one end and at its other end is threaded, or otherwise suitably secured, to a metal elbow 15 which serves as a conduit for the conductors 16 and also constitutes means for supporting the heating element 13 and its shell 14 from the flexible wall of the conduit C.

The elbow 15 extends snugly through the circular opening in the flexible wall of conduit C and is preferably provided with washers 17—17 which lie both inside and outside of the wall of conduit C. The washers may be formed either of metal or more flexible material; the said washers in the wall of conduit C being firmly clamped to an elbow flange 15ª by the nut 18. The latter may, if desired, form part of an electrical terminal socket 19. Thus, it will be seen that the socket member is rigidly mounted upon one end of the elbow 15; the heating element and its associated parts being carried upon the other end of said elbow.

Socket member 19 is provided with contacts 20—20 which are, of course, electrically connected with the heating element 13 by conductors 16. At 21 I have shown a plug member which is provided with blades 22—22 which, when the plug member is caused to cooperate with the socket member, engage contacts 20—20 and thus electrically connect the heating element 13 with the socket conductors illustrated at 23. Conductors 23 are, of course, connected with a source of electrical energy suitable for the operation of the heating coil 13. Ordinarily, the conductors 23 will be connected with the lighting circuit of a garage, in which case the resistance of the heating coil 13 will be relatively high. However, the storage battery of the automobile is employed as the source of current for exciting the heating element 13. The resistance of the latter will be comparatively less.

As soon as the heating element 13 of the apparatus of my invention is immersed in the water of the cooling system, practically all of the heat created by the heating element 13 is utilized to raise the temperature of the water in the cooling system. In this respect the apparatus of my invention is very efficient as compared with heaters previously used for similar purposes. The apparatus of my invention comprises a relatively few parts, which may be very easily assembled. In view of the fact that the flexible conduit C is formed of relatively inexpensive material, it is advisable to supply the same with the heating coil and its associated parts mounted therein and thereupon, as hereinbefore explained, in condition to be substituted for a substantially similar conduit already in use upon the automobile. Therefore, the installation of my improved heating apparatus upon any given automobile may be easily and quickly accomplished. A further advantage afforded by my invention results from the fact that the conduit C encloses and protects the heating element and its shell in direct shock. Furthermore, due to the resiliency of the conduit C, the heating element is adequately protected from the constantly occurring jars and jolts which are unavoidable in the operation of an automobile.

In Figure 3 I have illustrated an embodiment of my invention which comprises two heating coils indicated at 13$^a$ and 13$^b$, the first of these coils being adapted to be operated at relatively high voltage, say 110 volts, the other coil adapted to be operated at relatively low voltage, say 6 volts. Each of the heating coils just mentioned is suitably supported within and insulated from a metal shell 14$^a$, these shells communicating with and being supported by a T 24, which serves as a conduit for the heating coil conductors and which supports the heating coil shells 14$^a$—14$^a$ in exactly the same manner that the shell 14 of the apparatus shown in Figure 2 is supported by its associated elbow 15. The T 24 extends through and is secured to its associated flexible conduit C in substantially the same manner that the elbow 15 of Figure 2 is secured to its associated flexible conduit C.

That portion of the T 24 which extends outside of the conduit C carries a suitable socket member 25 which is preferably so constructed as to insure that the heating coil 13$^b$ shall not be subjected to the relatively high voltage which is required to operate the heating element 13$^a$.

Referring to Figure 4, it will be seen that the socket member 25 is provided with two pairs of recesses indicated at 26—26 and 27—27. It will be noticed that the space between the recesses 26 is considerably less than the space between the recesses 27. The recesses 26—26 affords access to suitable contacts which are electrically connected with the ends of the low voltage heating coil 13$^b$, while the recesses 27—27 afford access to contacts which are electrically connected with the ends of the high voltage heating coil 13$^a$.

In Figures 5 and 6 I have illustrated socket members adapted respectively to be connected with sources of current supply of high and low voltage. When the heating element 13$^a$ is to be used, the contact blades 28—28 of the plug member shown in Figures 5 and 7 are inserted in the openings 27—27 of the socket member 25, and when the heating element 13$^b$ is to be used, the contact blades 29—29 of the plug member shown in Figures 6 and 8 are inserted in the openings 26—26 of the socket member 25. Ordinarily, the conductors associated with the plug members shown in Figures 5 and 7 will be left in the garage for use when the heating element 13$^a$ is to be supplied with energy from the garage lighting circuit, the plug member shown in Figures 6 and 8 being carried in the automobile for use when the heating coil 13$^b$ is to be supplied from current from the storage battery carried by the machine. When the plug members are so used, there is practically no danger of destroying the heating coil 13$^b$ by inadvertently connecting it with a current supply of excessive voltage.

The heater-conduit of my invention may be used as a part of a cooling system of either a thermo-siphon type or of any of the types comprising water pumps of approved design.

I will say, however, that when my invention is incorporated in a system comprising a pump, there should be a relatively small by-pass around the pump or the pump itself should be so constructed as to allow a small amount of water to circulate therethrough when the pump is idle.

While I have illustrated certain preferred embodiments of my invention, I do not limit myself to the details of construction herein shown and described, but wish to have my invention limited only by the scope of the appended claims.

What I claim as new and desire to secure by Letters Patent of the United States is:

1. In an apparatus of the class described, a section of flexible conduit adapted for insertion in an engine cooling system as a part thereof, and an electric heater located within and supported by said conduit, said conduit serving to protect the heater against direct shocks and to cushion the heater against indirect shocks.

2. A heater-conduit for the purpose set forth, comprising a section of flexible conduit adapted to have its ends connected with and to establish communication between other conduits forming parts of the cooling system of an automobile engine, an electric heater disposed within the conduit and supported by the latter at a point intermediate its ends, and conductors for supplying current to said heater.

3. In a device of the class described, a section of flexible conduit adapted for insertion in an engine cooling system as a part thereof, an electric heating element, an elongated metal shell therefor, said shell being disposed within said conduit and lengthwise thereof, conductors associated with the heating element, and means which constitutes a conduit for said conductors and also serves to support said shell and heating element from the flexible wall of said conduit.

4. In a device of the class described, an electric heater comprising a heating element and a metal shell therefor, a section of flexible conduit which encloses and supports said heater, said conduit being adapted for insertion in an engine cooling system as a part thereof, conductors for said heater, an aperture in the wall of said conduit, a fitting extending through said aperture and constituting a conduit for said conductors, the heat element shell being mounted upon the inner end of said fitting, a terminal device mounted upon the outer end of said fitting, and means for securing said fitting in said aperture and for preventing leakage of liquid through the latter.

5. In a device of the class described, an electrical heating element, an elongated metal housing therefor, a section of flexible conduit which encloses said housing with the housing disposed lengthwise of the conduit, an aperture in the flexible wall of said conduit, a hollow fitting which extends through said aperture and has its inner end rigidly secured to said housing, conductors for said heater extending through said hollow fitting, and means for securing said hollow fitting in said aperture and for preventing leakage of liquid through the latter.

6. In combination, a conduit section adapted for insertion in an engine cooling system as a part thereof, an electric heater comprising a heating element and a metal housing therefor, said housing being disposed in said conduit and spaced from the wall thereof, an aperture in said conduit, a hollow fitting disposed in said aperture and having said heating element housing mounted upon its inner end, conductors for said heating element extending through said fitting, and means for securing said fitting in said aperture.

7. In a heater-conduit, the combination with a conduit section adapted for insertion in an engine cooling system as a part thereof, an electric heater enclosed by said conduit and spaced from the wall thereof, whereby said heater is immersed in the liquid which flows through said conduit, means for supporting said heater by the conduit, and means for supplying electrical energy to said heater.

8. In a heater-conduit, a section of conduit adapted for insertion in an engine cooling system as a part thereof, a pair of electric heaters having different electrical characteristics disposed in said conduit and spaced from the wall thereof, whereby said means are immersed in the liquid which flows through said conduit, an aperture in said conduit, a hollow fitting extending through said aperture and being secured therein, said fitting being attached to and serving to support said heaters, conductors for said heaters extending through said conduit, and an electric terminal device disposed outside of said conduit and supported by said fitting, said terminal device comprising two sets of dissimilar contact devices, the contact devices of each of said sets being connected with the conductors associated with one of said heaters.

9. In a device of the class described, the combination with a conduit forming part of the cooling system of an engine, a pair of electric heaters having different electrical characteristics disposed in said conduit and protected thereby, conductors for supplying electrical energy to said heaters and a terminal device disposed outside of said conduit, said terminal device comprising two dissimilar sets of contact devices, the contact devices of each set being connected with the conductors which supply electrical energy to one of said heaters.

10. In an apparatus of the class described, the combination with a conduit forming part of the cooling system of an engine, a pair of electric heaters disposed in said conduit and protected thereby, said heaters having different electrical characteristics, a protecting shell forming part of each of said heaters, an aperture in the wall of said conduit, a T fitting rigidly connected to said shell and extending through said aperture, means for securing said fitting in said aperture and for preventing the leakage of liquid through the latter, conductors associated with said heaters and extending through said fitting, and a terminal device located outside of the conduit and supported by said fitting, said terminal device comprising two dissimilar sets of contact devices, the contact devices of one of said sets being connected with the conductors associated with one of said heaters and the contact devices of the other set being similarly connected with the conductors associated with the other of said heaters.

In witness whereof, I hereunto subscribe my name this 13th day of April, 1923.

ROBERT H. WHITELEY.

Witnesses:
W. P. THACHER,
M. FORTUNATO.